United States Patent [19]
Kelm

[11] Patent Number: 5,447,355
[45] Date of Patent: Sep. 5, 1995

[54] DEVICE FOR ADJUSTING THE POSITION OF A SLIDING ROOF [COVER] WHICH CAN BE RAISED

[75] Inventor: Eckehart Kelm, Gilching, Germany

[73] Assignee: Rolf Farmont, Germany

[21] Appl. No.: 197,136

[22] Filed: Feb. 17, 1994

[30] Foreign Application Priority Data

Feb. 25, 1993 [DE] Germany .......... 9302762 U

[51] Int. Cl.6 .............................. B60J 7/047
[52] U.S. Cl. ................. 296/223; 296/216; 296/220; 296/224
[58] Field of Search ............ 296/216, 220, 223, 224

[56] References Cited

U.S. PATENT DOCUMENTS

| | | | |
|---|---|---|---|
| 4,403,805 | 9/1983 | Strem, Jr. et al. | 296/223 X |
| 4,601,512 | 7/1986 | Boots | 296/223 X |
| 4,609,222 | 9/1986 | Boots | 296/223 X |
| 4,643,478 | 2/1987 | Boots | 296/223 X |
| 4,647,105 | 3/1987 | Pollard | 296/221 |
| 4,982,995 | 1/1991 | Takahashi | 296/221 |
| 5,100,197 | 3/1992 | Ichinose et al. | 296/216 |

FOREIGN PATENT DOCUMENTS

| | | |
|---|---|---|
| 3020675 | 12/1981 | Germany . |
| 3416176 | 11/1984 | Germany . |
| 3442615 | 5/1986 | Germany . |
| 3442631 | 5/1986 | Germany . |
| 3536184 | 11/1986 | Germany . |
| 3707644 | 9/1987 | Germany . |
| 3919385 | 7/1990 | Germany . |
| 4031750 | 4/1991 | Germany . |

Primary Examiner—Dennis H. Pedder
Attorney, Agent, or Firm—Vickers, Daniels & Young

[57] ABSTRACT

A device for adjusting the position of a sliding roof cover is provided. The cover is capable of moving in a sliding fashion between a closed position and an open position relative to an opening in a roof. Transportation carriages for the cover are provided in a manner which permits sliding on guide rails. The transportation carriages are arranged on both sides of the opening in the roof. A lifting lever is mounted which permits turning at the transportation carriage about a pivot and at a connecting element about an articulated point. The lifting lever is connected to the cover by an intermediate lever. The intermediate lever is mounted in order that turning is permitted whereby the transportation carriage and the connecting element are capable of movement relative to one another.

7 Claims, 4 Drawing Sheets

DEVICE FOR ADJUSTING THE POSITION OF A SLIDING ROOF [COVER] WHICH CAN BE RAISED

The invention relates to a device for adjusting the position of a sliding roof which can be raised whereby the cover is capable of moving in a sliding fashion between the closed position and the opened position relative to an opening in the roof, whereby transportation carriages for the cover are located in a manner which permits sliding on guide rails which are arranged on both sides of the opening in the roof.

On opening and prior to sliding back from its closed position, the movable cover must be raised above the level of the fixed roof surface in the case of devices of this type for adjusting the position of a sliding roof which can be raised. The mechanism which is provided for this purpose does not only have to overcome the force of gravity on the cover—which, depending on the size and nature of the cover, can be considerable—but it must also surmount the sealing forces which hold the cover firmly in order to close off the roof if the device for adjusting the position of the sliding roof, which can be raised, is not to remain closed.

The devices which have become known previously for lifting up a sliding roof, which can be raised, are based on the use of guide slots and pegs with the help of which the cover is directed upward. For example, DE-3801881-C2 discloses a lifting device which has a front and a rear connecting guide for raising and lowering the cover. Connecting pegs with rollers engage with the slot there, as a result of which the path is defined for the displacement of the cover. Raising of the cover now takes place, in essence, via the feature that the connecting slots in the vertical projection are designed approximately in the shape of the letter S so that, on opening, the cover is guided upward as a result of movement of the connecting pegs. The force which is directed upward is generated by the vertical component of the movement.

Another form of embodiment is disclosed in EP-A-0 480 166 in which oblique positioning of a sun-roof is achieved by raising the cover on one side with the help of a lever. At its lower end, the lever is mounted in a manner which permits turning and engages, in each case, with connecting slots via laterally installed pegs in the center and at the upper end. The connecting slots are constructed in a simple linear fashion since upward movement of the cover is already engendered as a result of raising the lever.

To the extent that they are in any case capable of being used in conjunction with devices for adjusting the position of a sliding roof which can be raised, the adjustment devices which have become known previously all have the disadvantage in common, therefore, that frictional forces—which are generated as a result of the movement of pegs in connecting slots—have to be overcome on raising or, as the case may be, lifting up the cover from its closed position. In the case of devices with curved connecting slots, moreover, the force which is to be exerted depends on the ascent angle of the curve in the vertical direction; this leads, of necessity, to the feature that upward movement of the cover is associated with a relatively large horizontal movement. As a result, not only are the weight and the nature of the cover subjected to limitations but also its shape and size. Thus with conventional devices, a relatively thick cover of correspondingly weight would, for example, be capable of being lifted above the level of the fixed roof only with the exertion of large forces. In the case of the mechanisms which are known, conversely, a relatively lighter cover can be guided firmly into the closed position only with difficulty in such a way that the roof is sealed off in a rain-proof manner.

The task which forms the basis of the invention is to provide an adjusting device which ensures easy opening and firm closing of a sliding roof, which can be raised, in a manner which is independent of the size, weight and nature of the cover.

This task is accomplished by the features in the characterizing portion of claim 1. Further preferred embodiments of the invention result from the subsidiary claims.

In order to raise the cover, the invention makes use of a lifting lever which is mounted in a manner that permits it to turn at a transportation carriage and which is connected to the cover via an intermediate lever. The upward movement of the cover is produced exclusively by turning moments about the points at which the lifting lever and the intermediate lever are pivoted. After raising the cover, it is slid back into the open position. On the other hand, a support ensures tight positioning of the cover in the closed position.

A preferred example of an embodiment of the inventions will be elucidated in more detail using the accompanying drawings. The following aspects are shown.

Figure 1:
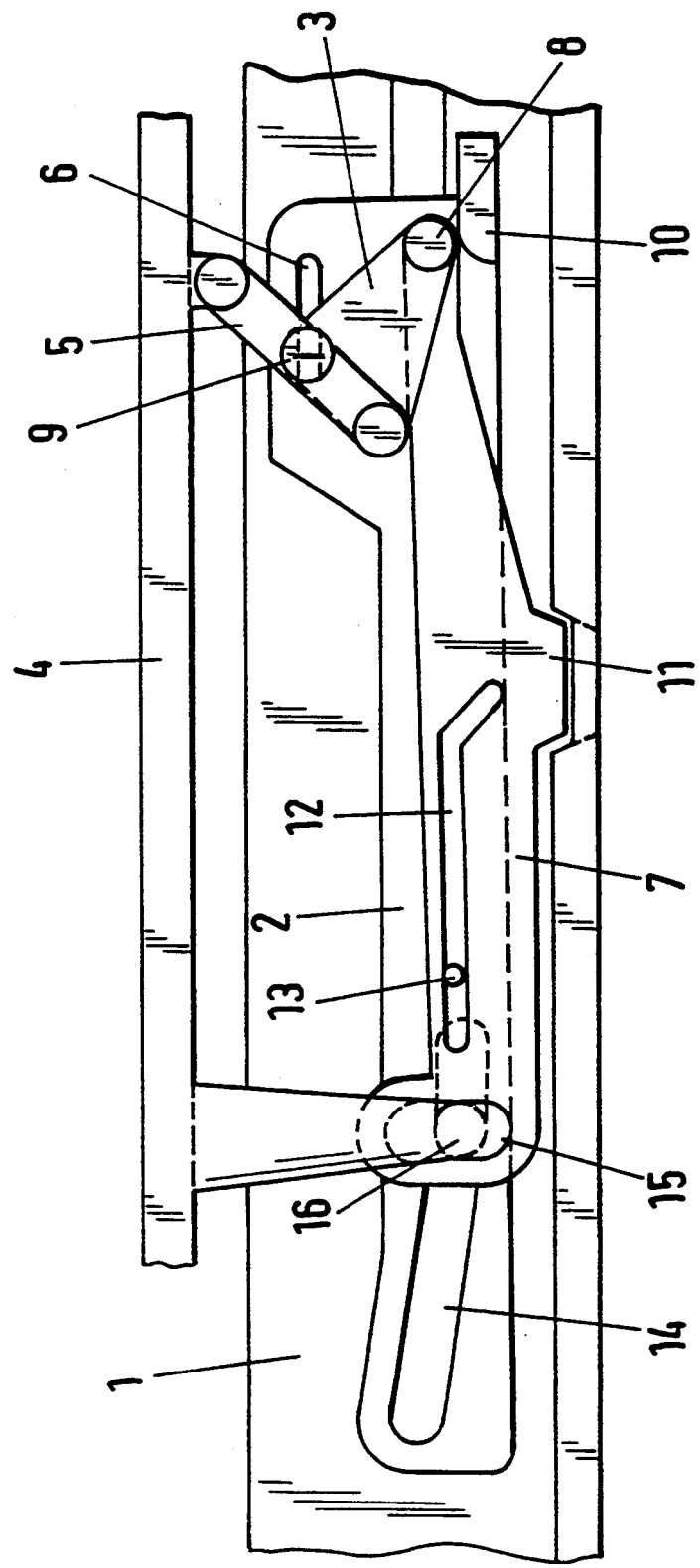
FIG. 1 shows a schematic lateral view of the adjusting device in accordance with the invention in the closed position of the cover.

The lateral view in FIG. 1 shows the position in which the mechanism is just moving out from the closed position or, as the case may be, it is just moving back into this position. Guide rails are installed in the frame 1 of the opening in the roof along which a transportation carriage 2 is capable of moving in a horizontal direction. In order to open the sliding roof, which can be raised, the transportation carriage is moved toward the rear (to the right in the figure). Relative to this movement, a connecting element 7, which extends laterally along the transportation carriage 2, remains at rest initially. As a result, an articulated point 8 slides from a support 10 to below the transportation carriage 2 and releases a lifting lever 3. The lifting lever 3 is now capable of turning about the articulated point 8 which connects it to the transportation carriage 2. The lifting lever is additionally connected to the transportation carriage at a pivot 9. During this initial horizontal movement of the transportation carriage, the pivot 9 has moved in a parallel manner in an oblong hole 6. The pivot 6 is constructed in such a manner that rotational movement about this point is not possible as long as the articulated point 8 is still located on the support 10. As a result, the firm holding of the cover in the closed position is, on the one hand intensified, and, on the other hand, raising of the cover is assisted following the release of the lifting lever. The lifting lever has a shape which resembles a triangle in which the first corner is defined by the articulated point 8, the second corner is defined by the pivot 9 and the third corner is defined by a point where rotation can occur at which the linear intermediate lever 5 is mounted by one end. The other end of the intermediate lever is connected to the roof 4 in a manner which permits rotation.

Figure 2:
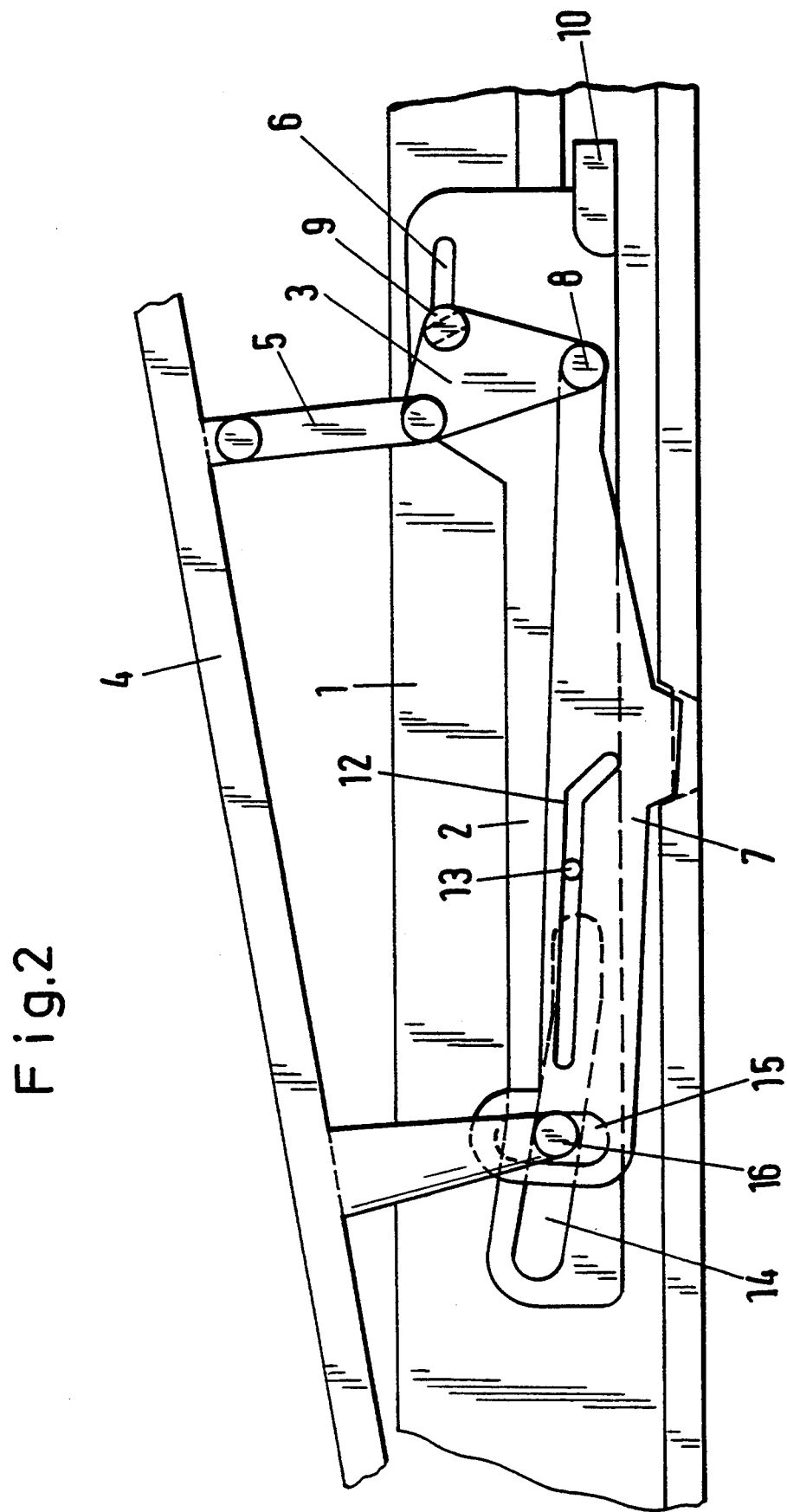
FIG. 2 shows a schematic lateral view of the adjusting device in accordance with the invention in the raised position of the cover.

If now—as has been shown in FIG. 2—the transportation carriage is drawn still further toward the rear (toward the right in the figure), then a turning moment about the pivot 9 is produced on the lifting lever 3 as a result of the feature that the pivot has reached the end of the oblong hole 6 and it is now carried along by the horizontal movement of the transportation carriage whereby, at the same time, the articulated point 8 is held firmly by the connecting element 7. The connecting element 7 itself does not participate in this initial horizontal movement, which serves to raise the cover, because it is restrained in its forward movement by a projection 11 which engages with an indentation in the frame of the roof. The projection and the indentation are constructed in such a way that they permit an easy tilting movement of the connecting element.

A peg 13 is provided at the transportation carriage 2 which engages in a connecting slot in the connecting element 7. If the transportation carriage is drawn back still further (toward the right in the figure), then the peg 13 arrives in a section of the connecting slot which is inclined downward whose vertical angle of inclination is arranged to be of such a magnitude that, as a result of further horizontal movement of the peg 13, the connecting element 7 is lifted up and the projection 11 is able to leave the indentation in the frame of tile roof. As a result, the connecting element—and hence the entire mechanism—is capable of moving freely in a horizontal direction and the cover can be slid back completely.

Sliding roof cover 4 includes a finger pivotably connected to transportation carriage 2 and connecting element 7 by pivoting peg 16 extending orthogonally from the finger. Pivoting peg 16 extends within transportation slot 14 of transportation carriage 2 and vertical slot 15 within connecting element 7. Transportation slot 14 is located forward of peg 13 and initially extends from peg 13 in a horizontal direction and then further extends in a direction inclined upward from horizontal. Vertical element 15, located forward of connecting slot 12, allows for sliding roof cover 4 to be lifted up in a vertical direction in accordance with the aforementioned description. Having been lifted vertically, sliding roof cover 4 is capable of the above-mentioned sliding in the horizontal direction due to the movement of pivoting peg 16 within transportation slot 14. As will be appreciated, especially from FIG. 2, movement of roof cover 4 in the horizontal direction causes connecting element 7 to slide relative to stationary transportation carriage 2.

Figure 3:
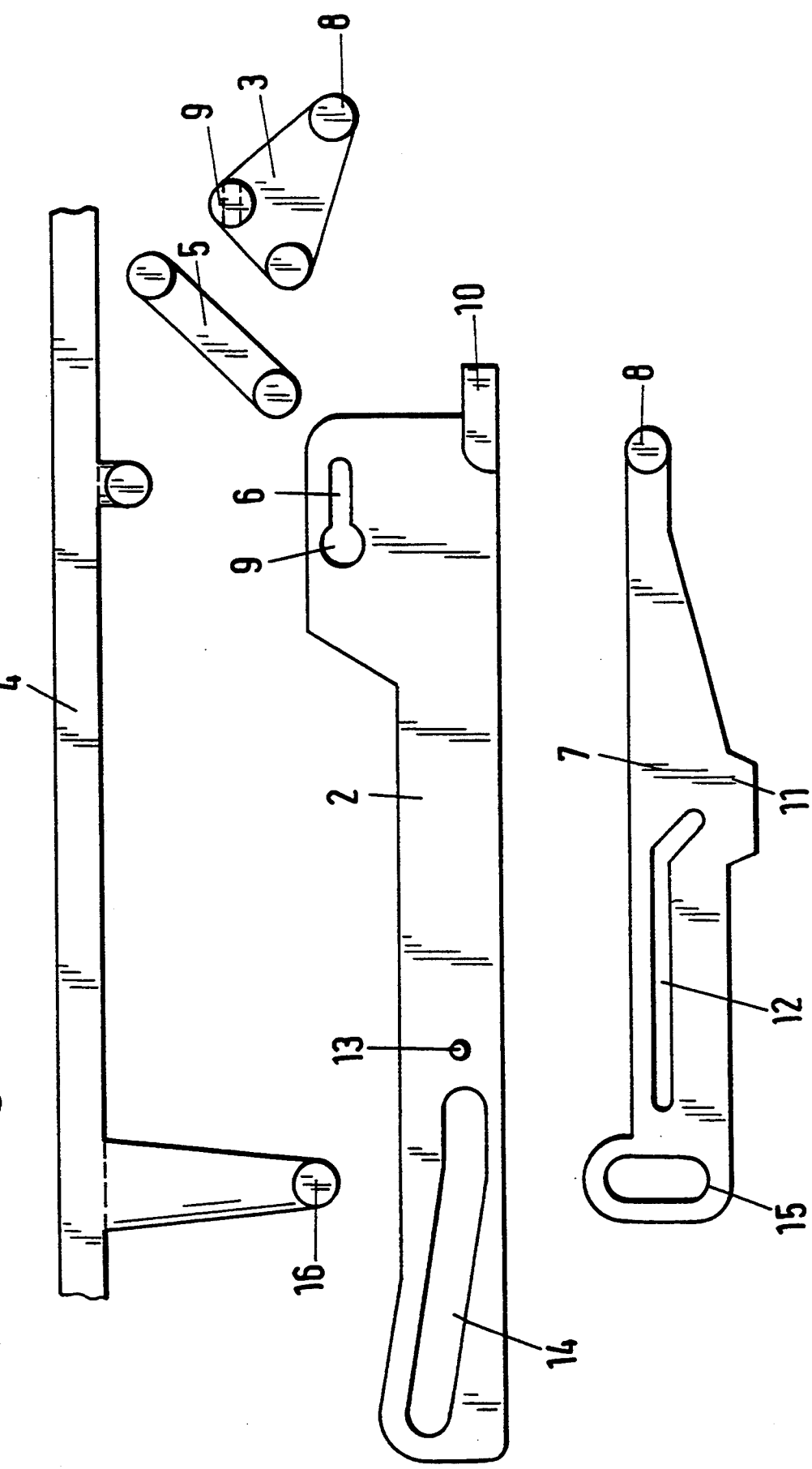
FIG. 3 shows a disassembled lateral view of the individual components of the adjusting device in accordance with the invention.
Figure 4:
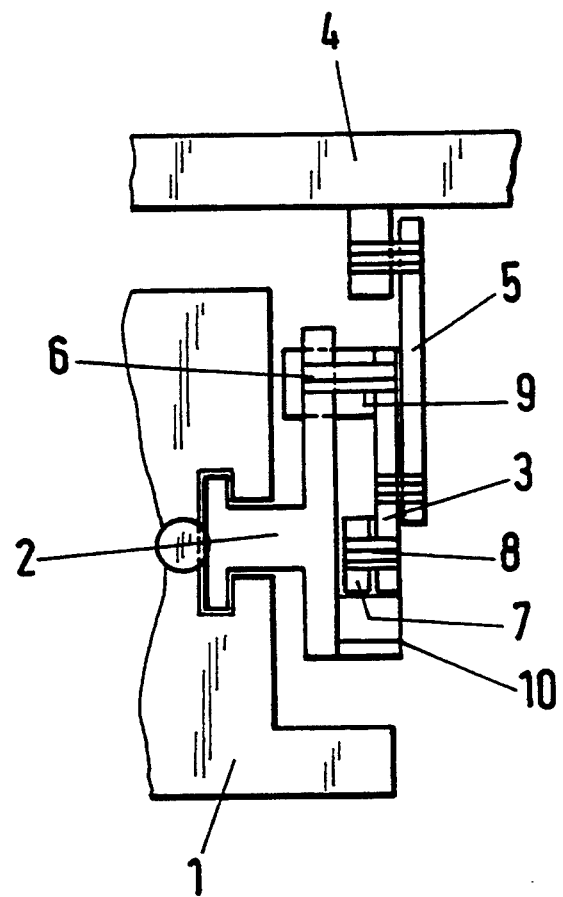
FIG. 4 shows a schematic front view of the adjusting device in accordance with the invention in the closed position of the cover.

The entire adjusting device comprises only four components, namely the transportation carriage 2, the lifting lever 3, the intermediate lever 5 and the connecting element 7. A sketch of the individual components and of the cover are shown in disassembled form in FIG. 3. The components are, in essence, constructed in a planar fashion and can, therefore, be accommodated in the frame of the roof in a manner which saves space.

Having thus described the invention, it is claimed:

1. A device for adjusting the position of a sliding roof cover which can be raised, said cover being capable of moving in a sliding fashion between a closed position and a raised opened position relative to an opening in a roof, and transportation carriages for said cover are installed in a manner which permits sliding on guide rails, said transportation carriages arranged on both sides of the opening in said roof, said device comprising a lifting lever pivotably mounted at said transportation carriage about a pivot and pivotably connected to a connecting element at an articulated point, said lifting lever connected to said cover by an intermediate lever, said intermediate lever pivotably mounted to said lifting lever, said connecting element having a projection and a connecting slot, said connecting slot comprising a horizontal section and a section which is inclined at an angle and whereby a peg on said transportation carriage engages in said connecting slot whereby said transportation carriage and said connecting element move relative to one another between said closed position and said raised opened position of said cover.

2. A device for adjusting the position of a sliding roof cover which can be raised, said cover being capable of moving in a sliding fashion between a closed position and a raised opened position relative to an opening in a roof, and transportation carriages for said cover are installed in a manner which permits sliding on guide rails, said transportation carriages arranged on both sides of the opening in said roof, said device comprising a lifting lever pivotably mounted at said transportation carriage about a pivot and pivotably connected to a connecting element at an articulated point, said lifting lever connected to said cover by an intermediate lever, said intermediate lever pivotably mounted to said liftinq lever, said transportation carriage being provided with an oblong hole that extends horizontally from said pivot, and permits movement of said pivot in a horizontal direction whereby said transportation carriage and said connecting element move relative to one another between said closed position and said raised opened position of said cover.

3. A device for adjusting the position of a sliding roof cover which can be raised, said cover being capable of moving in a sliding fashion between a closed position and a raised opened position relative to an opening in a roof, and transportation carriages for said cover are installed in a manner which permits sliding on guide rails, said transportation carriages arranged on both sides of the opening in said roof, said device comprising a lifting lever pivotably mounted at said transportation carriage about a pivot and pivotably connected to a connecting element at an articulated point, said lifting lever connected to said cover by an intermediate lever, said intermediate lever pivotably mounted to said lifting lever, said transportation carriage having a support on which said articulated point rests when said roof cover is in said closed position whereby said transportation carriage and said connecting element move relative to one another between said closed position and said raised opened position of said cover.

4. Adjusting device of claim 1, wherein said transportation carriage is provided with an oblong hole that extends horizontally from said pivot, and permits movement of said pivot in a horizontal direction.

5. Adjusting device of claim 4, wherein said transportation carriage has a support on which said articulated point rests when said roof cover is in said closed position.

6. Adjusting device of claim 1, wherein said transportation carriage has a support on which said articulated point rests when said roof cover is in said closed position.

7. Adjusting device of claim 2, wherein said transportation carriage has a support on which said articulated point rests when said roof cover is in said closed position.

* * * * *